United States Patent Office 2,873,681
Patented Feb. 17, 1959

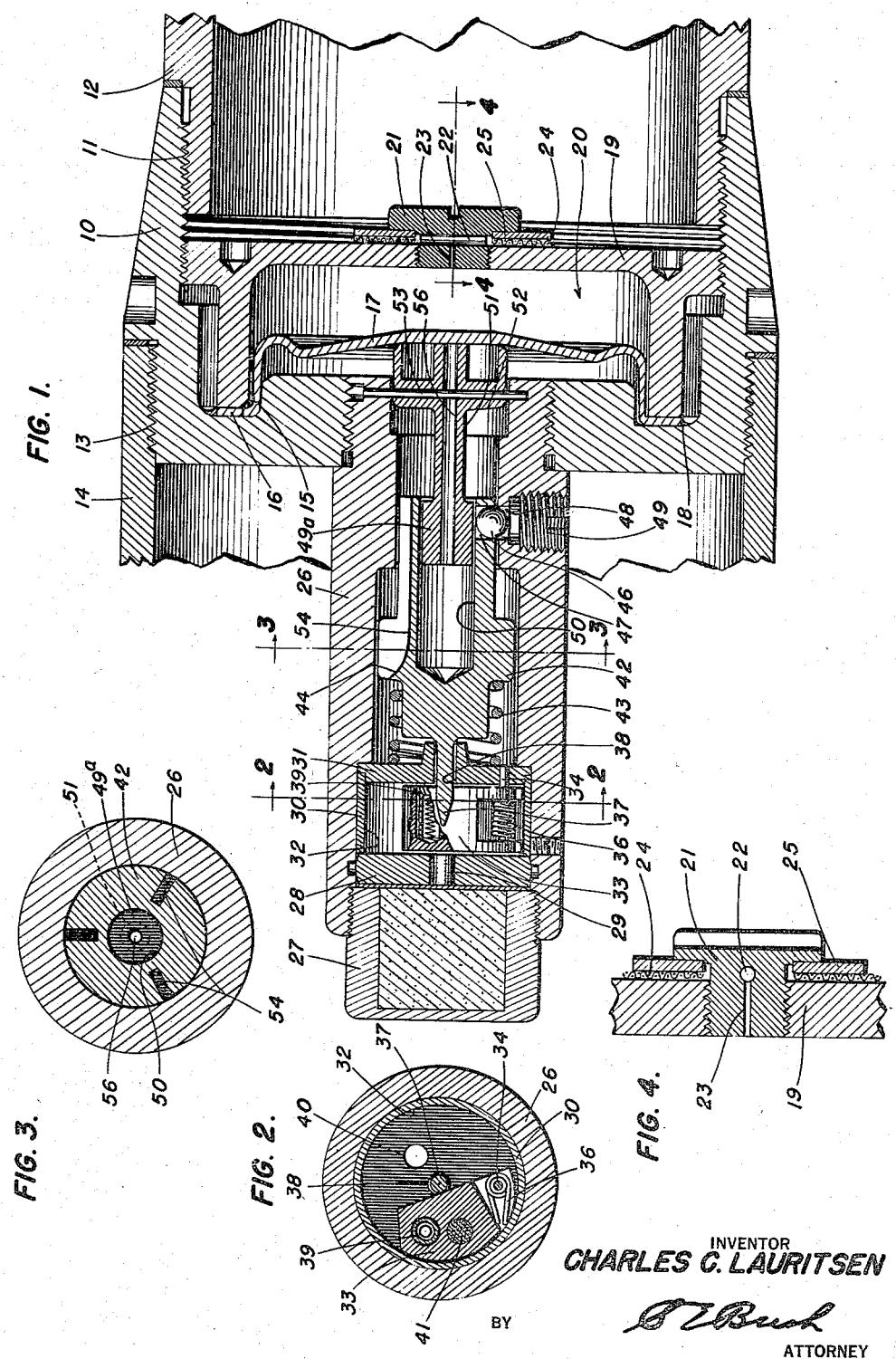

2,873,681

FUZE

Charles C. Lauritsen, Pasadena, Calif., assignor to the United States of America as represented by the Secretary of the Navy Application February 3, 1945, Serial No. 576,119

1 Claim. (Cl. 102—81)

This invention relates to fuzes and particularly to base fuzes for rocket projectiles. In a typical installation a fuze of my invention is interposed between the bomb portion and the motor portion of the rocket projectile and utilizes the gas pressure created in the normal operation of the rocket motor for arming. Several advantages of such an installation are immediately seen. For example, since the fuze is not dependent upon any external agency for its operation, it may be completely enclosed in the rocket assembly thus offering no resistance to travel of the projectile assembly through the air. Also, the great gas pressure built up in the rocket motor and conducted to the fuze for its operation permits the fuze to be ruggedly constructed without decreasing its reliability or sensitivity.

An object of the invention, therefore, is to provide a rocket projectile fuze of sturdy construction which will arm only under pressure of the gases produced by the combustion of the rocket propellant.

Another object of the invention is to provide a fuze which will arm only after it has travelled a safe predetermined distance from the launching mechanism.

Still another object of the present invention is to provide a rocket projectile fuze operable with none of its components exposed to the air.

For a more complete understanding of the invention, together with other objects and advantages thereof, reference may be had to the following specifications and drawings in which:

Fig. 1 is a longitudinal sectional view of a fuze representing a preferred embodiment of the invention;

Fig. 2 is a sectional view taken along line 2—2 of Fig. 1;

Fig. 3 is a sectional view taken along line 3—3 of Fig. 1;

Fig. 4 is a sectional view taken along line 4—4 of Fig. 1;

The fuze includes an adapter fitting 10 provided with internal threads 11 to receive the tube of a rocket motor 12 and external threads 13 which screw into the base of a bomb case 14 or the like. Adapter fitting 10 is provided with an annular groove 15 which receives a flange 16 of diaphragm 17. The diaphragm is sealed and secured at its circumference to adapter fitting 10 by solder joint 18 and is additionally held by the skirt of a cup-shaped partition member 19 which is screwed into internal threads 11 ahead of the rocket motor 12. Chamber 20 is defined by diaphragm 17 and partition member 19. Inlet screw 21 provides air communication through partition member 19 by means of ports 22 and 23. Inlet screen 24, held tightly under washer 25 by inlet screw 21, acts as a filter to prevent the entrance of debris into ports 22 and 23.

The base of adapter fitting 10 receives a hollow casing 26 of smaller diameter than the adapter fitting. Fitted into the extreme forward end of casing 26 is a booster cup 27, the interior end of which is covered by partition 28 having a lead-in 29 of tetryl or the like. Spacer ring 30 and partition 31 define, with partition 28, a shutter chamber 32. Booster cup 27 serves as a retaining nut to hold partitions 28 and 31 and spacer ring 30 in position. Shutter chamber 32 accommodates shutter 33, best shown in Fig. 2, which is mounted on pivot pin 34. A spring 36 wound around pivot pin 34 tends to move shutter 33 clockwise from the position shown in Fig. 2, but is prevented from doing so by the protrusion of firing pin 37 through guide hole 38 in partition 31 and into shutter chamber 32. A spring-loaded detent 39 is carried by shutter 33 and engages detent hole 40 in partition 31 when the shutter is in the armed position. Detonator 41 is carried by shutter 33 and is so positioned that it is aligned with firing pin 37 and lead-in 29 when the shutter is in the armed position.

Firing pin 37 is screwed into or formed integrally with a firing pin block 42 which is slidably mounted in the middle portion of casing 26. A spring 43 is initially compressed and interposed between shoulder 44 on firing pin block 42 and the partition 31. Firing pin block 42 is initially restrained in a forward position by key balls such as 46, only one of which is shown in Fig. 1, disposed partly in radial openings 47 in the rearward end of the firing pin block, and partly in matching radial openings 48 in casing 26. The latter openings may be closed and adjusted for depth by set screws 49. In this position of firing pin block 42, firing pin 37 protrudes from partition 31 to restrain the shutter 33. The key balls 46 are restrained in their locking position by locking rod 49a mounted coaxially and slidably within socket 50 of firing pin block 42. A constriction 51 on the exterior of locking rod 49a affords an escape inwardly for the key balls 46 when the constriction is moved opposite the latter. This action releases the firing pin block 42. The locking rod 49a is provided with a head 52 positioned for engagement by diaphragm 17. A shear wire 53 extends through casing 26 and locking rod 49a to prevent premature motion of the latter. Slits 54 in firing pin block 42 and port 56 in locking rod 49a prevent compression of air behind those parts when they are moved in the normal operation of the fuze.

The fuze of the invention operates as follows: Initially the fuze is in the unarmed position shown in Fig. 1. When the rocket motor 12 is fired, the pressure due to burning of the propellant in the rocket motor is applied to the side of diaphragm 17 exposed to chamber 20 causing the diaphragm to collapse. This does not take place immediately since chamber 20 is relatively large and ports 22 and 23 are small. The amount of the time delay thus introduced in therefore dependent upon the dimensions of chamber 20 and ports 22 and 23, and upon the strength of diaphragm 17. A diaphragm designed to collapse at 500 pounds per square inch has been found suitable. The shape of the diaphragm is such that when it is forced past a neutral or center point, it snaps into its collapsed position. When the diaphragm collapses, the locking rod 49a severs shear wire 53 and is forced axially into chamber 50 of firing pin block 42 bringing constriction 51 opposite key balls 46. Thereupon, the latter move radially inward into the constriction 51, leaving firing pin block 42 free to move in the direction of the diaphragm 17 under the combined forces of acceleration and spring 43. Firing pin 37 is thus withdrawn from shutter chamber 32, permitting shutter 33 to move into the armed position. Thereafter, when the bomb strikes a target, the firing pin block 42, moving forward in the fuze under its own inertia, drives firing pin 37 into detonator 41 which, in turn, detonates lead-in 29 and the booster charge in booster cup 27.

While what has been described is particularly illustrative of a preferred embodiment of my invention, it is not intended that the scope of the invention be limited

I claim:

A fuze mount consisting of a fitting deeply recessed and having a central opening leading to the recess, a cup-shaped partition member secured in one end of the fitting and having a cup-flange extending into the recess, the partition portion of the member having a port, a snap-action diaphragm clamped between the fitting and said member, being distanced from each to define a space next to the fitting and a chamber next to the partition portion with which chamber the port is in communication, a fuze having a casing secured in the central opening and carrying a detonator, a locking rod slidable in the casing, having one end crossing the space to contact the diaphragm, a firing pin having means for urging it into an armed position with respect to the detonator, and latch means initially restraining the firing pin from assuming its armed position, being held in the restrained position by the lock rod until displacement of the lock rod by permanent collapse of the diaphragm into the space by an accumulation of pressure gas in the chamber through said port.

References Cited in the file of this patent

UNITED STATES PATENTS

| | | |
|---|---|---|
| 1,224,163 | Hale | May 1, 1917 |
| 1,850,196 | Bardsley | Mar. 22, 1932 |
| 2,030,085 | Woodberry | Feb. 11, 1936 |
| 2,145,507 | Denoix | Jan. 31, 1939 |
| 2,368,747 | Doe et al. | Feb. 6, 1945 |

FOREIGN PATENTS

| | | |
|---|---|---|
| 522,990 | Great Britain | July 2, 1940 |